United States Patent [19]
Ito

[11] Patent Number: 5,543,969
[45] Date of Patent: Aug. 6, 1996

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 997,559

[22] Filed: Dec. 28, 1992

[30] Foreign Application Priority Data

Dec. 25, 1991 [JP] Japan .................................. 3-361412
Sep. 8, 1992 [JP] Japan .................................. 4-239125

[51] Int. Cl.$^6$ ................................................. G02B 15/14
[52] U.S. Cl. .......................... 359/690; 359/687; 359/686
[58] Field of Search ................................. 359/690, 686, 359/687, 688

[56] References Cited

U.S. PATENT DOCUMENTS

| | | |
|---|---|---|
| 3,784,284 | 1/1974 | Nakamura . |
| 3,918,797 | 11/1975 | Takano . |
| 4,168,110 | 9/1979 | Itoh . |
| 4,196,969 | 4/1980 | Itoh . |
| 4,230,397 | 10/1980 | Fleischman . |
| 4,293,197 | 10/1981 | Kobayashi et al. . |
| 4,348,082 | 9/1982 | Ogawa . |
| 4,452,513 | 6/1984 | Hamanishi . |
| 4,576,443 | 3/1986 | Itoh . |
| 4,763,998 | 8/1988 | Tsuji et al. . |
| 4,844,599 | 7/1989 | Ito . |
| 4,871,241 | 10/1989 | Matsuo . |
| 4,917,482 | 4/1990 | Ito . |
| 4,991,942 | 2/1991 | Fujibayashi et al. . |
| 5,144,488 | 9/1992 | Endo et al. ............................ 359/686 |
| 5,257,135 | 10/1993 | Kohno et al. ........................... 359/690 |

*Primary Examiner*—Georgia Y. Epps
*Assistant Examiner*—Michael A. Papalas
*Attorney, Agent, or Firm*—Greenblum & Bernstein P.L.C.

[57] ABSTRACT

A zoom lens system having in order from the object side, a first positive lens group, a second negative lens group and a third positive lens group. At least the second lens group and the third lens group are movable along an optical axis for changing magnification. This lens system further satisfies the following conditions:

(a) $0 < fw/f1 < 0.25$
(b) $-0.9 < fw/f2 < -0.4$
(c) $0.3 < fw/f3 < 0.8$
(d) $0.7 < \log z3/\log z < 1.0$ where fw is the focal length of the overall system at the wide angle end, fi is the focal length (i=1, 2, 3) of the i-th lens group, z is the change ratio (z=ft/fw) of magnification of the overall system, ft is the focal length of the overall system at the telescopic end, z3 is the change ratio (z3=m3t/m3w) of magnification of the third lens group, m3t is a lateral magnification of the third lens group at the wide angle end, m3w is a lateral magnification of the third lens group at the telescopic end.

13 Claims, 10 Drawing Sheets

ZOOM LENS SYSTEM

BACKGROUND OF THE INVENTION

1. Field of the Invention

The present invention is related to a zoom lens system used for a compact video camera, an electronic still camera, or the like.

2. Description of the Prior Art

In recent years, compact video cameras and electronic still cameras having a ½ inch or a ⅓ inch screen and a CCD as a light receiving element have been developed.

A taking lens used for these kinds of camera is a compact zoom lens system which has small F-number(it is bright). A retro-focus zoom lens system having 2 lens groups, the first of which has a negative first lens group is known as a conventional compact zoom lens system. However, for a retro-focus type 2 group zoom lens system to make an F aof bout 1:2, the diameter of a lens of a back group must be made obtrusively large. Moreover, high order spherical aberration occurs.

Moreover, a 4 group type zoom lens system is known for use as a small F number zoom lens system. The known 4 group type lens has a positive first lens group, a negative second lens group as a variable power lens, a negative third lens group as a compensator, and a positive fourth lens group as a master lens.

However, the 4 group type zoom lens system has long overall length, and the diameter of a front side lens must be made large.

In a conventional three group zoom lens system, a first lens group or a part of a third lens group (master lens group) is moved along an optical axis in order to adjust a focus.

However, when the first lens group is moved, if the minimum photography distance needs to be shortened, the moving amount of the first lens and the diameter or the lens system are both very large. Moreover, when the third lens is moved, change of an aberration by focusing becomes large.

SUMMARY OF THE INVENTION

An object of the present invention is to provide a zoom lens system of which f number is about 1:2 on the wide-angle side and the change ratio of magnification is about 3-times. Another object of the present invention is to provide a compact and long back focus zoom lens system that is suitable with a video camera or an electronic still camera.

The above and other objects of the present invention are attained by a zoom lens system having, in order from the object side, a first positive lens group, a second negative lens group and a third positive lens group. At least the second lens group and the third lens group are moved along an optical axis for changing magnification. This lens further satisfies the following conditions:

(a) $0 < fw/f1 < 0.25$
(b) $-0.9 < fw/f2 < -0.4$
(c) $0.3 < fw/f3 < 0.8$
(d) $0.7 < \log z3 / \log z < 1.0$ where fw is focal length of the overall system at the wide angle end, fi is focal length (i=1, 2, 3) of the i-th lens group.

z is the change ratio (z=ft/fw) of magnification of the overall system, ft is focal length of the overall system at the telescopic end, z3 is the change ratio (z3=m3t/m3w) of magnification of the third lens group, m3t is a lateral magnification of the third lens group at the wide angle end, m3w is a lateral magnification of the third lens group at the telescopic end.

Another object of the present invention is to provide a zoom lens system which is able to shorten the minimum photography distance without enlarging the diameter of a lens and to reduce the change of the aberration at the time of focusing.

To accomplish this object, the zoom lens system of the present invention comprises, in order from the object side, a first positive lens group, a second negative lens group and a third positive lens group, wherein the second lens group and the third lens group are moved along an optical axis for changing magnification, and the second lens group is moved for focusing.

DETAILED DESCRIPTION OF THE EMBODIMENTS

The embodiments of the present invention will now be described hereinafter with reference to the drawings. The present disclosure relates to subject matter contained in Japanese patent application Nos. H3-361412 (filed on Dec. 25, 1991) and H4-239125 (filed on Sep. 8, 1992) which are expressly incorporated herein by reference in their entireties.

The zoom lens system of the present invention uses a new zooming method and focusing method which is like a combination of the conventional retro-focus 2 group type zoom lens system and a 4 group type zoom lens system.

The zooming methods of the present invention and the conventional 4 group type zoom system are compared below. The second and the third lens groups move in both systems. However, the conventional system gives the function which mainly changes magnification to the second lens group, and is giving the function which compensates focus error caused by changing of magnification to the third lens group.

On the other hand, in the system of the present invention, the third lens group has the function of changing magnification and the function as a master lens. The second lens group achieves auxiliary function of changing magnification, and has the function to compensate focus error caused by changing of magnification.

The zoom lens system of the present invention is provided with, in order from the object side, a first positive lens group, a second negative lens group and a third positive lens group. At least the second lens group and the third lens group are moved along an optical axis for changing :magnification. This lens further satisfies the following conditions:

(a) $0<fw/f1<0.25$ (b) $-0.9<fw/f2<-0.4$ (c) $0.3<fw/f3<0.8$ (d) $0.7<\log z3/\log z<1.0$ where fw is the focal length of the overall system at the wide angle end, fi is the focal length (i=1, 2, 3) of the i-th lens group, z is the change ratio (z=ft/fw) of magnification of the overall system.

ft is focal length of the overall system at the telescopic end, z3 is the change ratio (z3=m3t/m3w) of magnification of the third lens group, m3t is a lateral magnification of the third lens group at the wide angle end, m3w is a lateral magnification of the third lens group at the telescopic end, Condition (a) is to determine the power of the first lens group. If the lower limit of condition (a) is exceeded, since power of the first lens group becomes negative, the diameter of a lens of a back group becomes large and a bright zoom lens system of which F number is about 1:2 can not be obtained. On the other hand, if the upper limit is exceeded, positive power of the first lens group becomes large, a magnification change function of the second lens group will grow, and change of the aberration at the time of changing magnification will become large.

Condition (b) specifies the power of the second lens group. If the lower limit of condition (b) is exceeded, negative power will become large and the aberration at the time of changing magnification will be changed. On the other hand, a lens will become large if the upper limit is exceeded.

Condition (c) specifies the power of the third lens group. If the lower limit of condition (c) is exceeded, since the power of the third lens group becomes small, the amount of movement of the third lens group for changing magnification will become large, and the overall length of the lens will become large. On the other hand, if the upper limit of condition (c) is exceeded, since the power becomes large, the change of the aberration at the time of changing magnification becomes large.

Condition (d) specifies enlarging a magnification change function of the third lens group compared to the same of the second lens group. If the lower limit of the condition (d) is exceeded, the magnification change function of the second lens group will grow, and correction of an aberration will become difficult to change. On the other hand, if the upper limit is exceeded, since only the third lens group will come to have a magnification change function, the ratio of magnification change cannot be made high.

When the zoom lens system satisfies these conditions at the same time, a compact zoom lens system capable of a change ratio of magnification about 3 times can be obtained.

Moreover, in order to obtain a more compact zoom lens system, it is desirable to satisfy the following conditions (e) and (f).

(e) $-1<m2<0$ (f) $m3t<-1<m3w$

Where m2 is a lateral magnification of the second lens group from the wide angle side to a tele photographing side, Conditions (e) and (f) specify the lateral magnification of the second lens group and the third lens group. By satisfying these conditions, the direction of movement of the second lens group is changed at intermediate focal length. Moreover, since the third lens group is moved to the side of an object corresponding to the increase in focal length, It can obtain a more compact zoom lens system.

Furthermore, in order to prepare a beam splitter between the image surface and the lens, it is desirable to satisfy the following condition (g):

(g) $1.5<fBw/fw$

Where fBw is the back focus at the end of the wide angle.

The back focus is defined as the interval between a last surface of a lens system and a image surface.

Condition (g) specifies a back focus. By satisfying this condition, two or more beam splitters can be prepared between a lens and an image side.

In addition, an aperture may be disposed in front of the third lens group, or inside the third lens group. When the aperture is disposed in front of the third lens group, the diameter of a lens at the front side can be made smaller. Moreover, when the aperture is disposed inside the third fells group, the ghost by the image surface or a surface of the master lens can be effectively prevented.

Moreover, it is desirable to assign the focusing function to the second lens group which has larger power than the first lens. If the focusing function is assigned to the first lens group, the available amount of light in the periphery of the field runs short.

At this time, it is desirable to satisfy the following conditions (h):

(h) $0.0<\log z2/\log z<0.3$

Where z2 is the magnification ratio (z2=m2L/m2S) of the second lens group, m2L is a lateral magnification of the second lens group at the telescopic end, and m2S is a lateral magnification of the second lens group at the wide angle end.

Condition (h) specifies a magnification change function of the second lens group. By satisfying this condition, it is able to reduce the dispersion of the lens moving amount for the focusing in each focal length.

For example, when the distance from an object to an image surface is 0.2 m, the relationships between the focal length (f) and the lens moving amounts (X) of the embodiments 1 and 2 are shown in the following table.

| f | X(Embodiment 1) | X(Embodiment 2) |
|---|---|---|
| 6.15 | 1.14 | 1.01 |
| 12.0 | 1.51 | 1.22 |
| 17.5 | 1.57 | 1.21 |

Furthermore, in the embodiment 3, when the distance from an object to an image surface is 0.1 m, the range of the lens moving amount X is 2.95–3.06, and therefore, the dispersion or the amount X can be reduced under 0.1 mm.

And also, it is desirable to satisfy the conditions (i) and (j) in order to obtain the long back focus.

(i) $1.0 < dS/ft < 2.0$ (j) $2.1 < fBw/fw < 3.5$

Where dS is distance between the second lens group and the third lens group.

The condition (i) specifies the distance between the second and the third lens groups. If the lower limit of the condition (i) is exeeded, the change of the abberations at the time of changing magnification will become large in order to obtain a long back focus.

If the upper limit of the condition (i) is exeeded, the overall length of the zoom lens system and the diameter of a lens of a front group will become large.

The condition (j) specifies the back focus in narrower range than the condition (g).

Some numerical examples of the invention will now be described:

Embodiment 1

Figure 1:
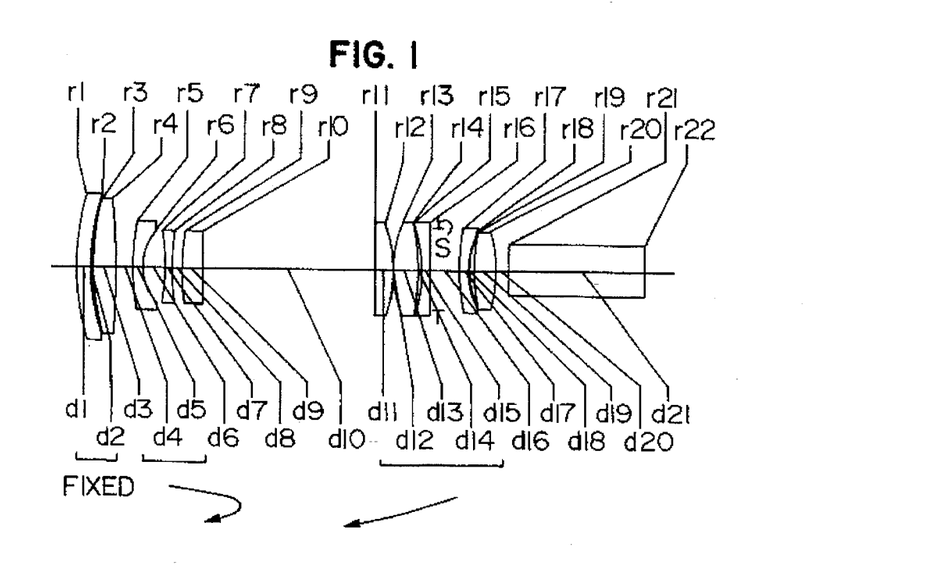
FIG. 1 is a section through the lens of Embodiment 1.

FIG. 1 shows a first embodiment of the invention. Specific numerical examples are shown in Tables 1 and 2.

in the tables, r is the radius of curvature, d is the inter-surface distance, N is the refractive index, v is Abbe number, f is the focal length, fB is the back focus, FNo. is f-number and ω is half view angle. In the following embodiments, the back focus fB is defined by the following equation.

$$fB = d20 + d21/n21$$

A plane parallel plate shown by surface numbers 21 and 22 indicates a beam splitter, which is shown in expanded form, mounted between the zoom lens system and an Image surface.

Figure 2:
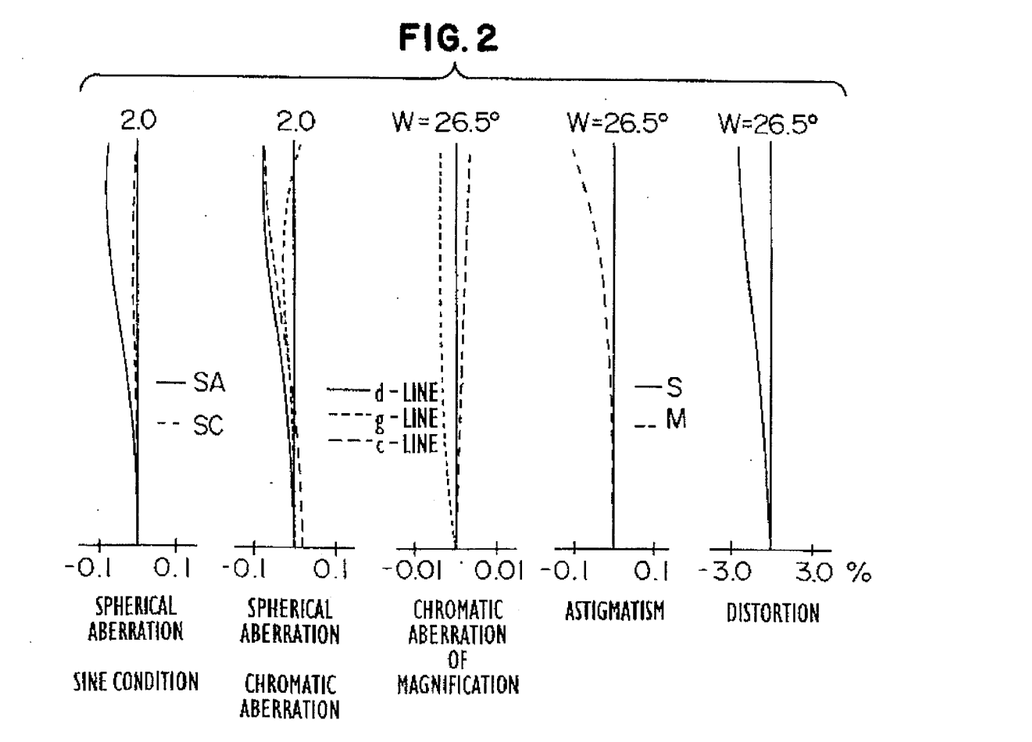
FIG. 2 is a diagram of aberrations in the wide angle end of Embodiment 1.
Figure 3:
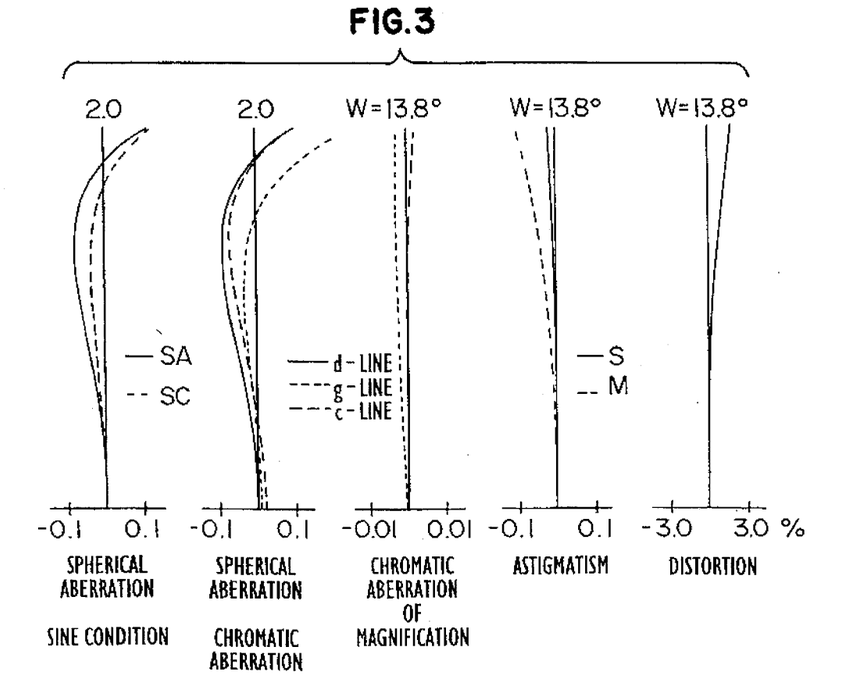
FIG. 3 Is a diagram of aberrations in the intermediate focal length of Embodiment 1.
Figure 4:
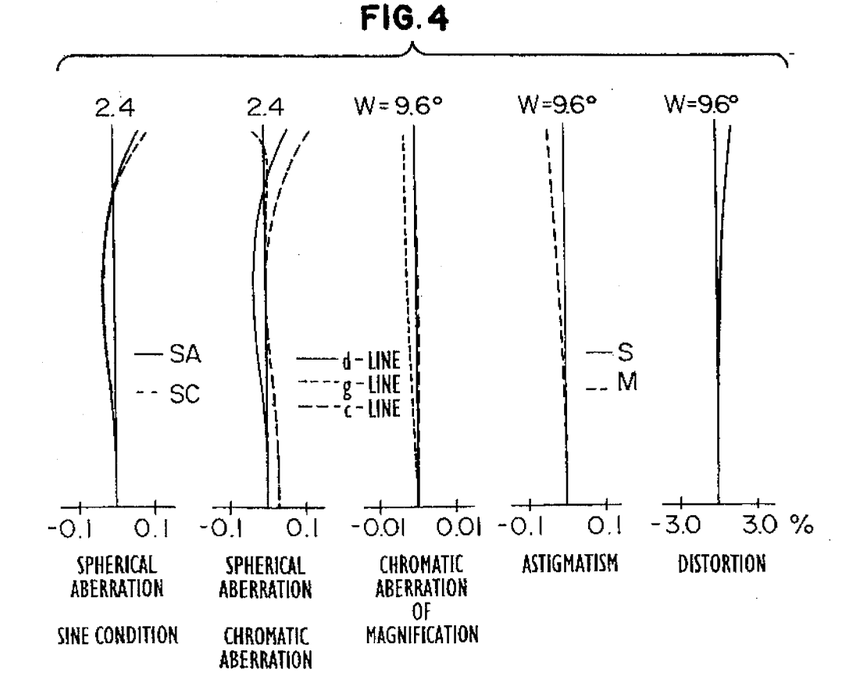
FIG. 4 is a diagram of aberrations in the telescopic end of Embodiment 1.

FIGS. 2, 3 and 4 show Spherical aberration SA, Sine condition SC, Chromatic aberration shown by spherical aberrations in d-line (588 nm), g-line (436 nm) and C-line (656 nm), Chromatic aberration of magnification, Astigmatism (S: sagittal, M: meridional) which are produced by this arrangement in the wide angle end, intermediate position and telescopic end respectively.

TABEL 1

| Surface number | r | d | n | v |
|---|---|---|---|---|
| 1 | 28.795 | 1.40 | 1.80518 | 25.4 |
| 2 | 20.910 | 0.45 | | |
| 3 | 31.730 | 2.69 | 1.69680 | 55.5 |
| 4 | −135.229 | variable | | |
| 5 | 45.427 | 1.00 | 1.83481 | 42.7 |
| 6 | 6.656 | 2.72 | | |
| 7 | −20.299 | 0.90 | 1.77250 | 49.6 |
| 8 | 44.075 | 1.11 | | |
| 9 | 17.912 | 2.40 | 1.84666 | 23.8 |
| 10 | −357.973 | variable | | |
| 11 | −311.568 | 2.02 | 1.80400 | 46.6 |
| 12 | −23.121 | 0.10 | | |
| 13 | 15.462 | 2.63 | 1.77250 | 49.6 |
| 14 | −77.216 | 0.49 | | |
| 15 | −25.865 | 1.10 | 1.80518 | 25.4 |
| 16 | 127.915 | 3.67 | | |
| 17 | 33.345 | 1.00 | 1.84666 | 23.8 |
| 18 | 10.550 | 0.55 | | |
| 19 | 18.179 | 2.60 | 1.69680 | 55.5 |
| 20 | −15.998 | variable | | |
| 21 | ∞ | 16.20 | 1.49782 | 66.8 |
| 22 | ∞ | | | |

TABLE 2

| FNo. | 2.1 | 2.0 | 2.4 |
|---|---|---|---|
| f | 6.15 | 12.00 | 17.50 |
| fB | 0.00 | 0.00 | 0.00 |
| ω | 26.5 | 13.8 | 9.6 |
| d4 | 2.30 | 10.12 | 11.22 |
| d10 | 20.47 | 8.58 | 3.02 |
| d20 | 2.01 | 6.09 | 10.54 |

Embodiment 2

Figure 5:
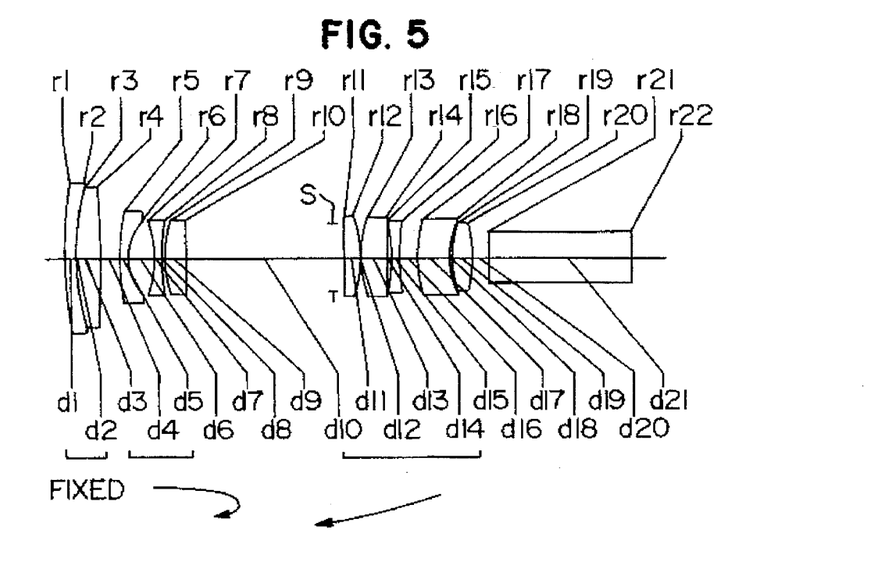
FIG. 5 is a section through the lens of Embodiment 2.
Figure 6:
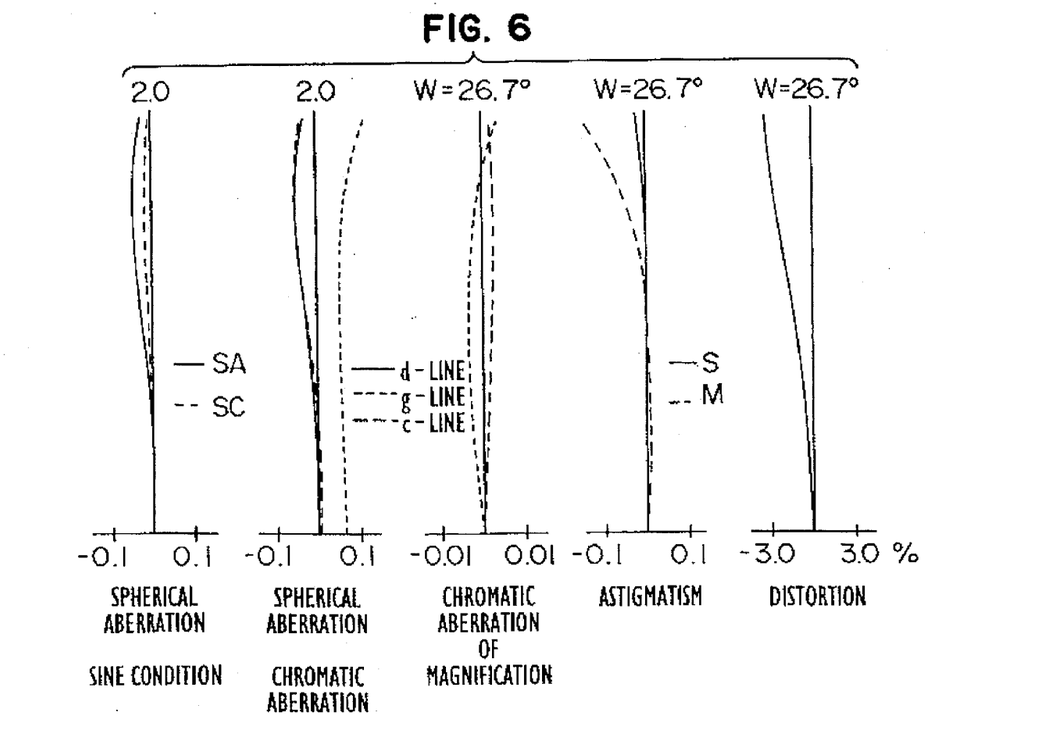
FIG. 6 is a diagram of aberrations in the wide angle end of Embodiment 2.
Figure 7:
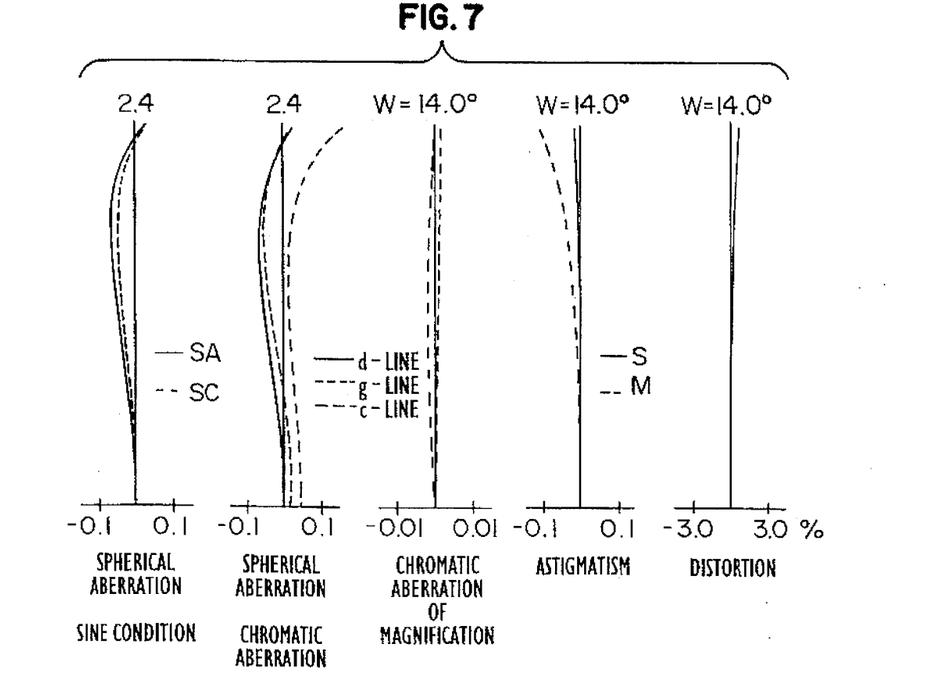
FIG. 7 is a diagram of aberrations in the intermediate focal length of Embodiment 2.
Figure 8:
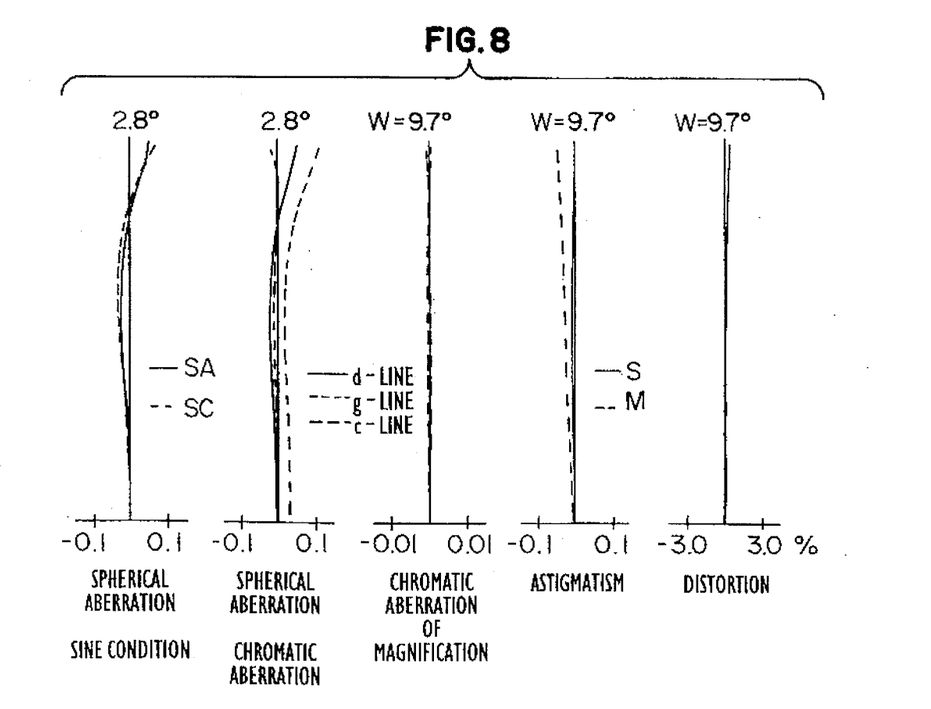
FIG. 8 is a diagram of aberrations in the telescopic end of Embodiment 2.

FIG. 5 shows a second embodiment of this invention. Specific numerical examples are shown in Tables 3 and 4. FIGS. 6. 7 and 8 show the aberrations produced by this arrangement in the wide angle end, intermediate position and telescopic end respectively.

TABLE 3

| Surface number | r | d | n | v |
|---|---|---|---|---|
| 1 | 48.543 | 1.40 | 1.80518 | 25.4 |
| 2 | 32.536 | 0.00 | | |
| 3 | 32.536 | 2.59 | 1.69680 | 55.5 |
| 4 | −520.912 | variable | | |
| 5 | 17.833 | 1.00 | 1.77250 | 49.6 |
| 6 | 5.742 | 2.89 | | |
| 7 | −15.626 | 0.90 | 1.77250 | 49.6 |
| 8 | 24.610 | 0.54 | | |
| 9 | 14.675 | 2.30 | 1.84666 | 23.8 |
| 10 | −238.854 | variable | | |
| 11 | −187.185 | 1.84 | 1.69680 | 55.5 |
| 12 | −20.008 | 0.10 | | |
| 13 | 13.745 | 3.10 | 1.77250 | 49.6 |
| 14 | −145.272 | 0.36 | | |
| 15 | −26.752 | 1.00 | 1.84666 | 23.8 |
| 16 | 28.172 | 2.20 | | |
| 17 | 19.509 | 3.50 | 1.80518 | 25.4 |
| 18 | 9.719 | 0.37 | | |
| 19 | 14.255 | 2.20 | 1.77250 | 49.6 |
| 20 | −17.484 | variable | | |
| 21 | ∞ | 16.20 | 1.49782 | 66.8 |
| 22 | ∞ | | | |

TABLE 4

| FNo. | 2.0 | 2.4 | 2.8 |
|---|---|---|---|
| f | 6.15 | 12.00 | 17.50 |
| fB | 0.00 | 0.00 | 0.00 |
| ω | 26.7 | 14.0 | 9.7 |

TABLE 4-continued

| FNo. | 2.0 | 2.4 | 2.8 |
|---|---|---|---|
| d4 | 2.30 | 9.00 | 8.78 |
| d10 | 18.09 | 6.77 | 1.80 |
| d20 | 1.93 | 6.55 | 11.74 |

Embodiment 3

Figure 9:
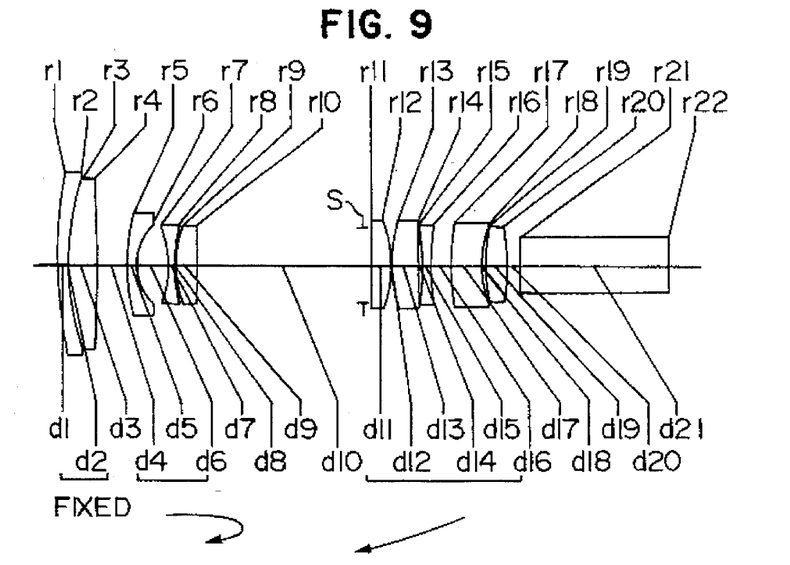
FIG. 9 is a section through the lens of Embodiment 3.
Figure 10:
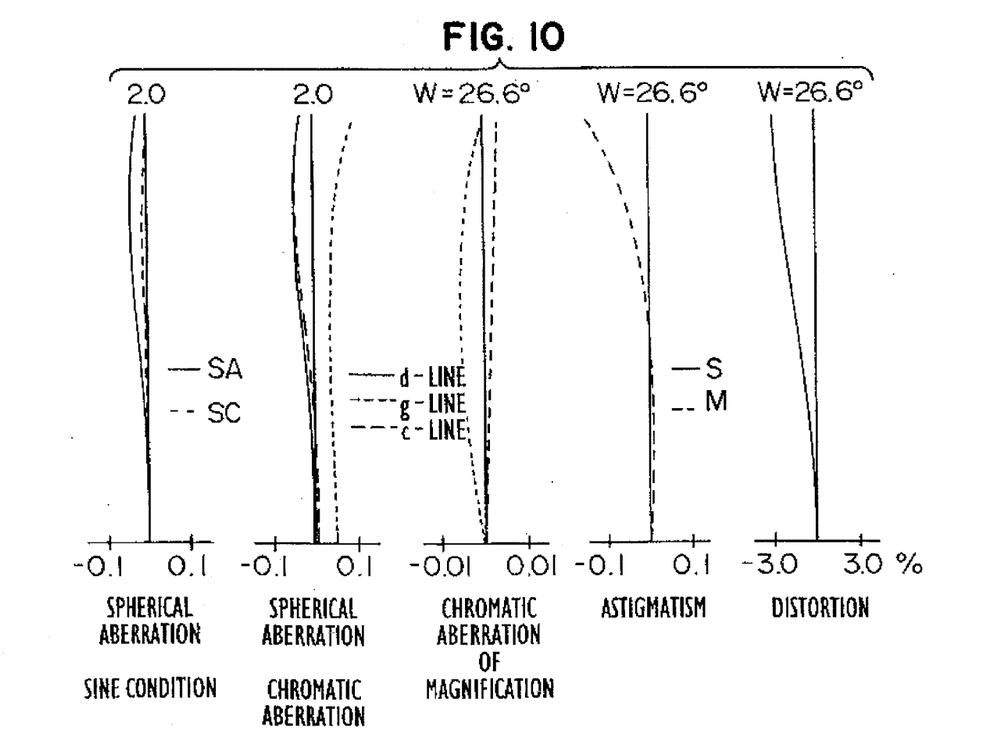
FIG. 10 is a diagram of aberrations in the wide angle end of Embodiment 3.
Figure 11:
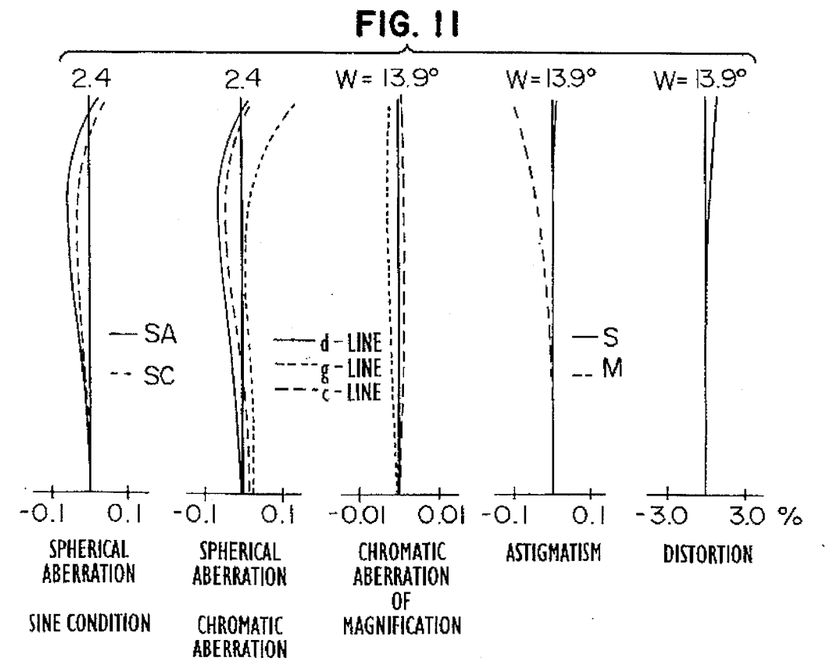
FIG. 11 is a diagram of aberrations in the intermediate focal length of Embodiment 3.
Figure 12:
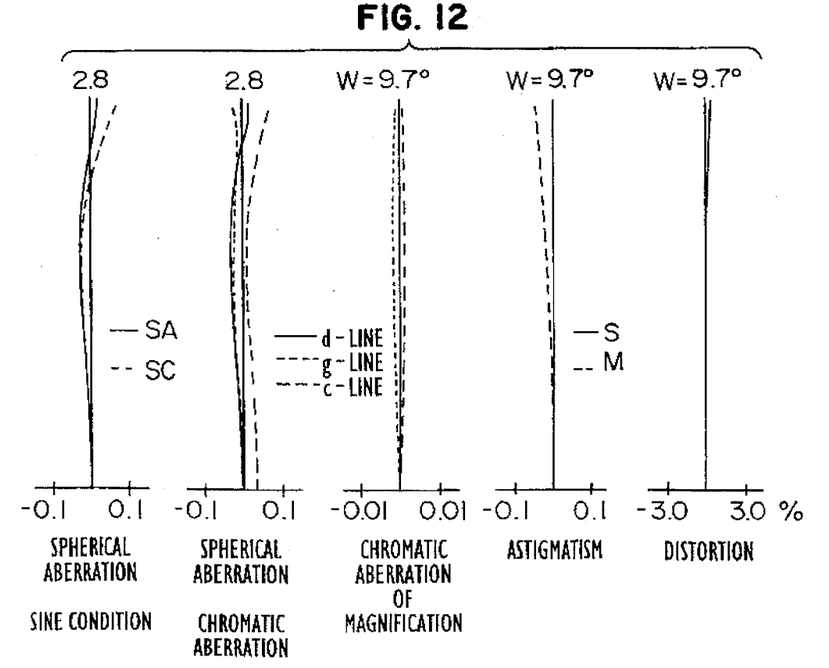
FIG. 12 is a diagram of aberrations in the telescopic end of Embodiment 3.

FIG. 9 shows a third embodiment of this invention. Specific numerical examples are shown in Tables 5 and 6. FIGS. 10, 11 and 12 show the aberrations produced by this arrangement in the wide angle end, intermediate position and telescopic end respectively.

TABLE 5

| Surface number | r | d | n | ν |
|---|---|---|---|---|
| 1 | 53.595 | 1.40 | 1.80518 | 25.4 |
| 2 | 36.114 | 0.00 | | |
| 3 | 36.114 | 2.85 | 1.69680 | 55.5 |
| 4 | −346.993 | variable | | |
| 5 | 18.487 | 1.00 | 1.77250 | 49.6 |
| 6 | 5.744 | 3.46 | | |
| 7 | −14.666 | 1.00 | 1.77250 | 49.6 |
| 8 | 31.999 | 0.10 | | |
| 9 | 14.503 | 2.30 | 1.84666 | 23.8 |
| 10 | −319.236 | variable | | |
| 11 | −309.023 | 1.92 | 1.69680 | 55.5 |
| 12 | −19.418 | 0.10 | | |
| 13 | 14.518 | 3.10 | 1.77250 | 49.6 |
| 14 | −106.483 | 0.36 | | |
| 15 | −26.562 | 1.00 | 1.84666 | 23.8 |
| 16 | 26.562 | 2.16 | | |
| 17 | 17.284 | 3.50 | 1.80518 | 25.4 |
| 18 | 10.313 | 0.46 | | |
| 19 | 18.044 | 2.40 | 1.77250 | 49.6 |
| 20 | −18.044 | variable | | |
| 21 | ∞ | 17.00 | 1.49782 | 66.8 |
| 22 | ∞ | | | |

TABLE 6

| FNo. | 2.0 | 2.4 | 2.8 |
|---|---|---|---|
| f | 6.15 | 12.00 | 17.50 |
| fB | 0.00 | 0.00 | 0.00 |
| ω | 26.6 | 13.9 | 9.7 |
| d4 | 3.60 | 10.34 | 9.99 |
| d10 | 19.58 | 8.05 | 3.00 |
| d20 | 1.50 | 6.29 | 11.71 |

Embodiment 4

Figure 13:
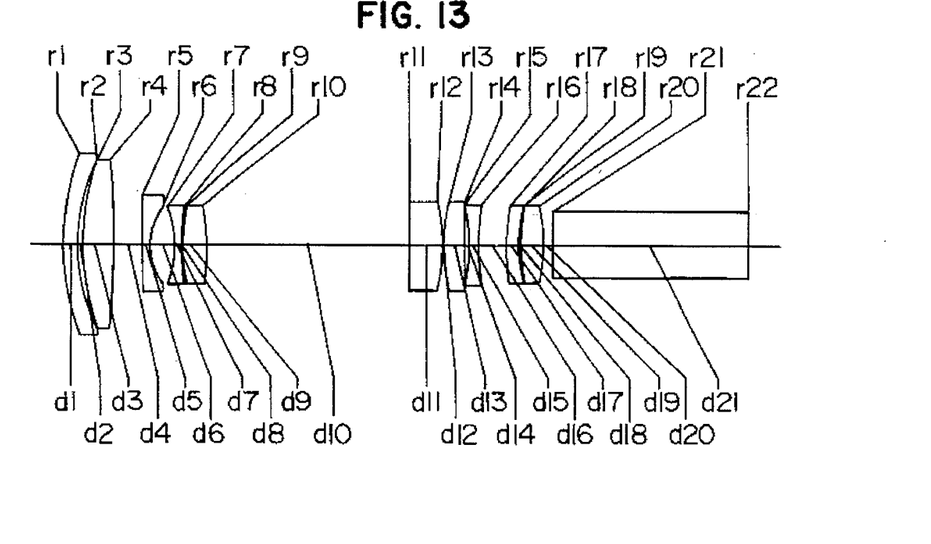
FIG. 13 is a section through the lens of Embodiment 4.
Figure 14:
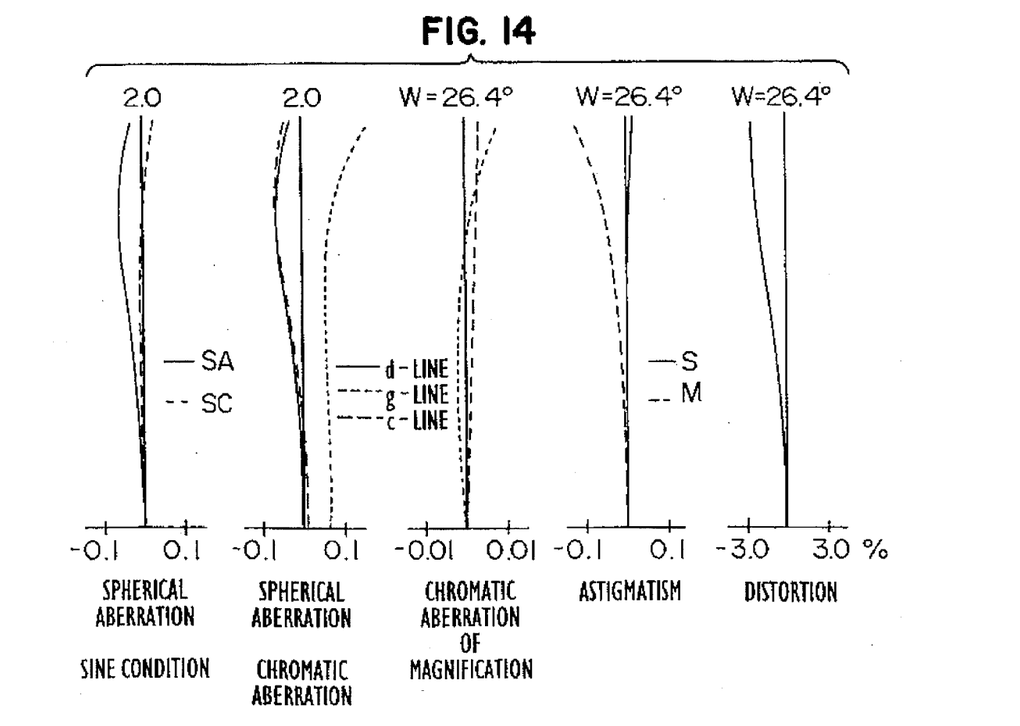
FIG. 14 is a diagram of aberrations in the wide angle end of Embodiment 4.
Figure 15:
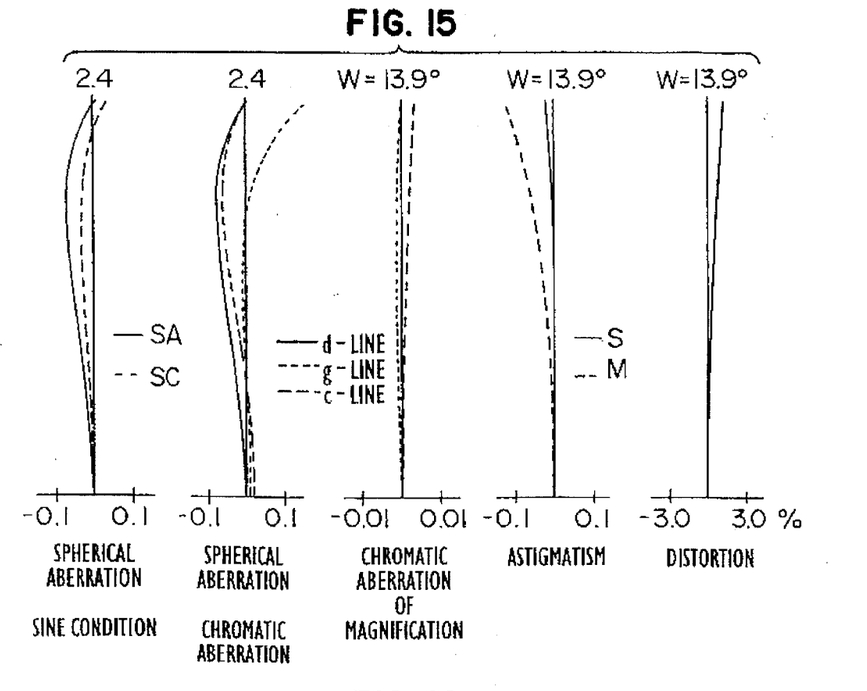
FIG. 15 is a diagram of aberrations in the intermediate focal length of Embodiment 4.
Figure 16:
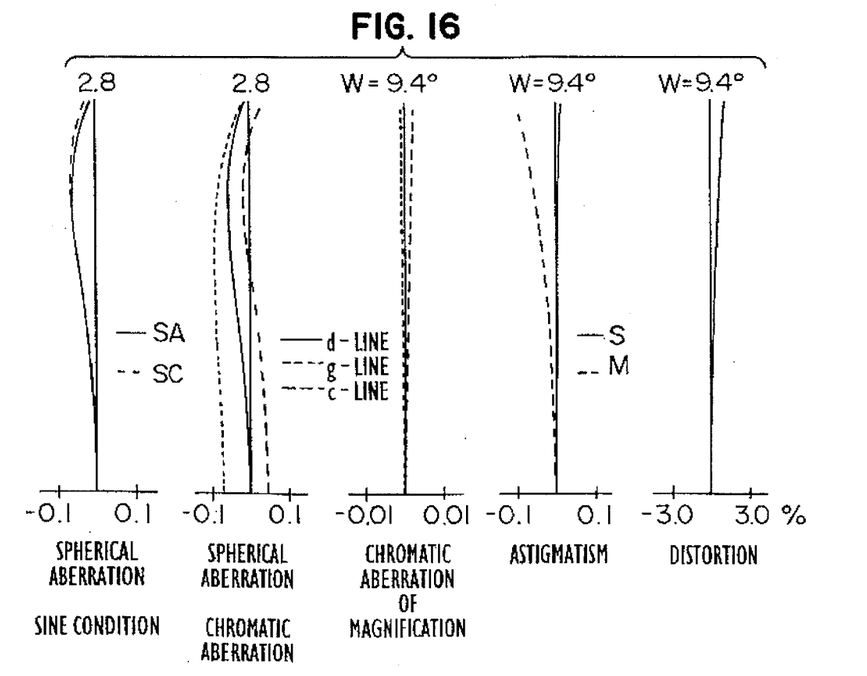
FIG. 16 is a diagram of aberrations in the telescopic end of Embodiment 4.

FIG. 13 shows a fourth embodiment of this invention. Specific numerical examples are shown in Tables 7 and 8. FIGS. 14, 15 and 16 show the aberrations produced by tills arrangement in the wide angle end, intermediate position and telescopic end respectively.

TABLE 7

| Surface number | r | d | n | ν |
|---|---|---|---|---|
| 1 | 30.068 | 1.40 | 1.80518 | 25.4 |
| 2 | 19.874 | 0.59 | | |
| 3 | 25.140 | 3.78 | 1.58267 | 46.4 |
| 4 | −107.221 | variable | | |
| 5 | 60.319 | 1.00 | 1.83481 | 42.7 |
| 6 | 6.573 | 2.71 | | |
| 7 | −16.257 | 1.00 | 1.80400 | 46.6 |
| 8 | 45.243 | 0.10 | | |
| 9 | 16.256 | 2.90 | 1.84666 | 23.8 |

TABLE 7-continued

| Surface number | r | d | n | ν |
|---|---|---|---|---|
| 10 | −41.887 | variable | | |
| 11 | −388.257 | 3.90 | 1.74950 | 35.3 |
| 12 | −25.427 | 0.10 | | |
| 13 | 16.085 | 2.54 | 1.77250 | 49.6 |
| 14 | −74.583 | 0.32 | | |
| 15 | −28.012 | 1.10 | 1.84666 | 23.8 |
| 16 | 28.012 | 3.31 | | |
| 17 | 25.756 | 1.20 | 1.80518 | 25.4 |
| 18 | 13.011 | 0.34 | | |
| 19 | 19.623 | 2.63 | 1.77250 | 49.6 |
| 20 | −19.623 | variable | | |
| 21 | ∞ | 23.00 | 1.49782 | 66.8 |
| 22 | ∞ | | | |

TABLE 8

| FNo. | 2.0 | 2.4 | 2.8 |
|---|---|---|---|
| f | 6.20 | 12.00 | 18.00 |
| fB | 0.00 | 0.00 | 0.00 |
| ω | 26.4 | 13.9 | 9.4 |
| d4 | 3.20 | 12.39 | 14.45 |
| d10 | 23.88 | 10.72 | 4.06 |
| d20 | 1.00 | 4.97 | 9.57 |

Embodiment 5

Figure 17:
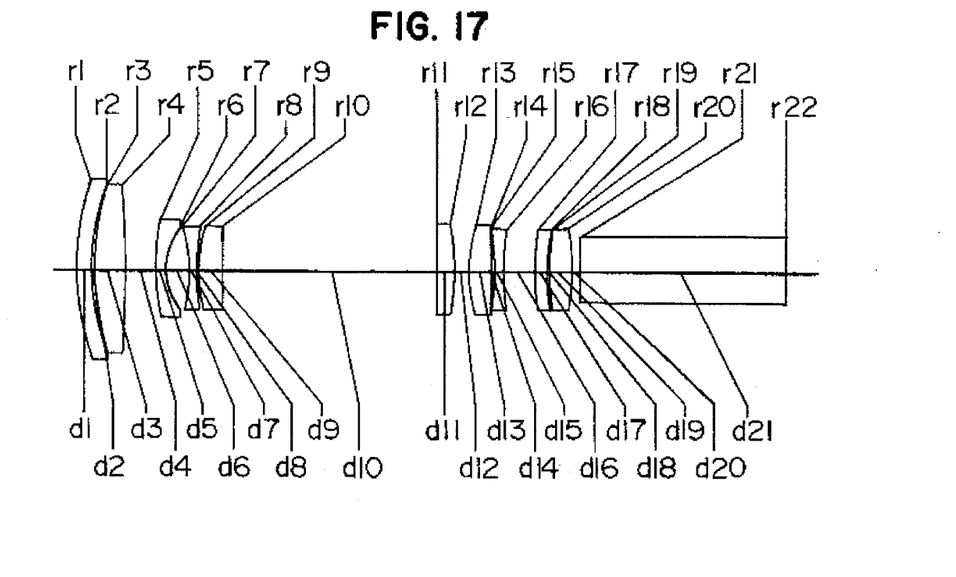
FIG. 17 is a section through the lens of Embodiment 5.
Figure 18:
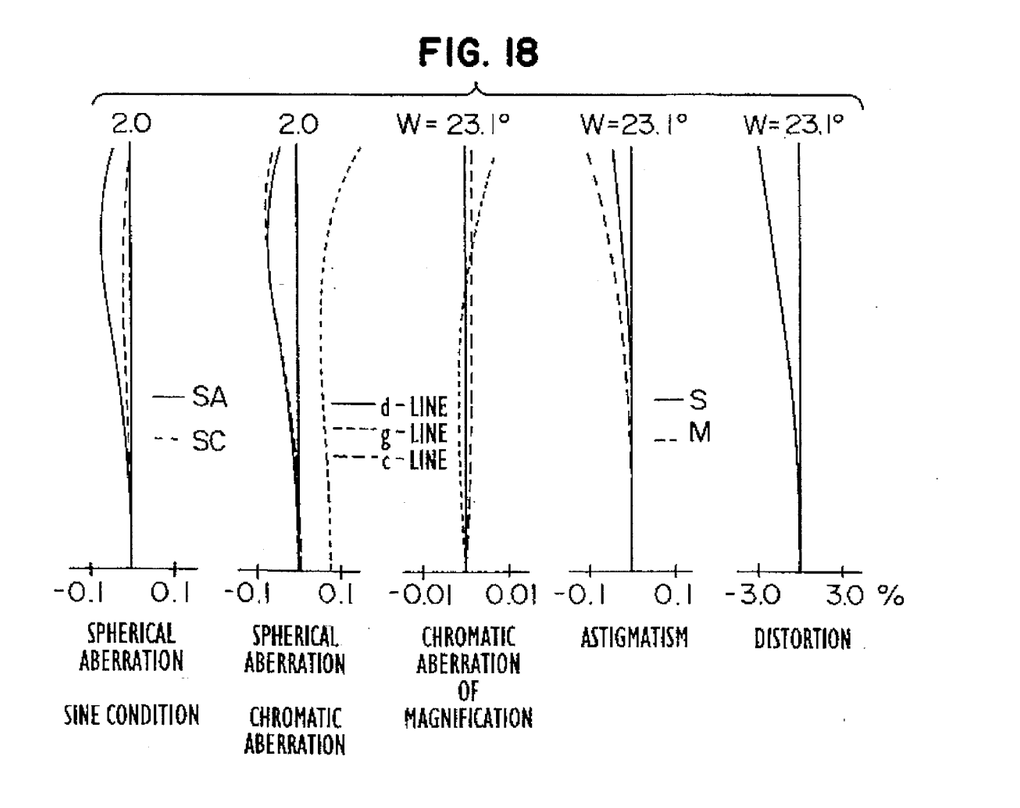
FIG. 18 is a diagram of aberrations in the wide angle end of Embodiment 5.
Figure 19:
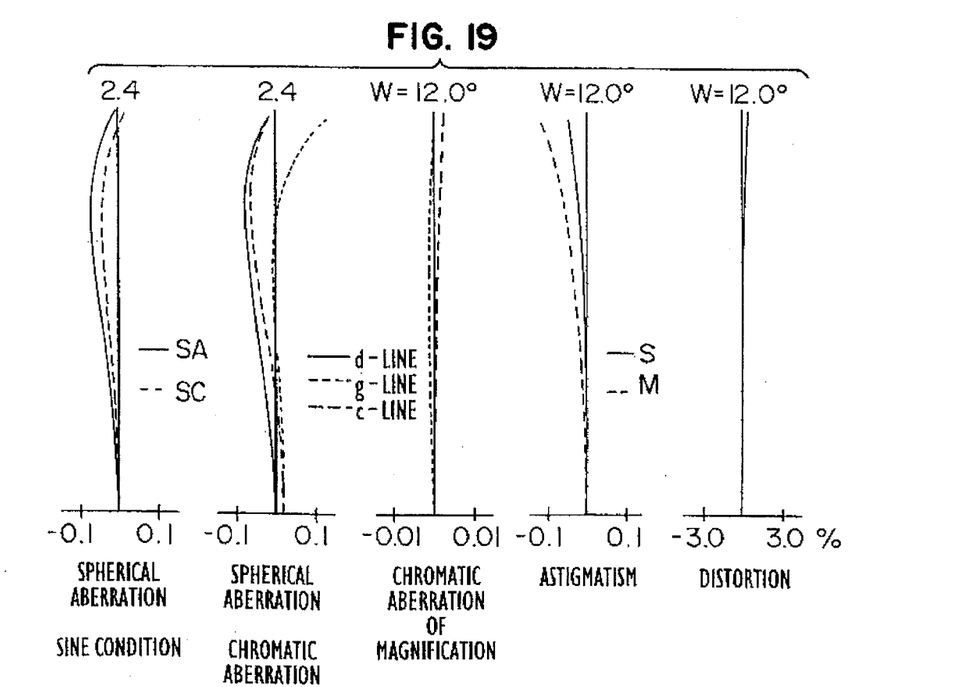
FIG. 19 is a diagram of aberrations in the intermediate focal length of Embodiment 5.
Figure 20:
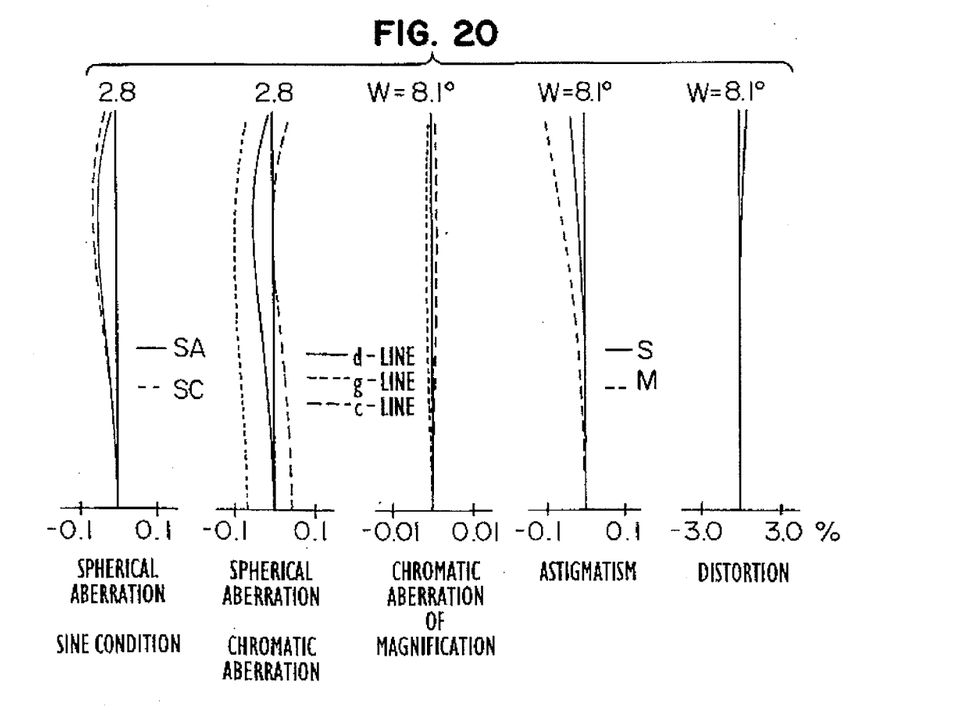
FIG. 20 is a diagram of aberrations in the telescopic end of Embodiment 5.

FIG. 17 shows a fifth embodiment of this invention. Specific numerical examples are shown in Tables 9 and 10. FIGS. 18, 19 and 20 show the aberrations produced by this arrangement in the wide angle end, intermediate position and telescopic end respectively.

TABLE 9

| Surface number | r | d | n | ν |
|---|---|---|---|---|
| 1 | 35.284 | 1.39 | 1.80518 | 25.4 |
| 2 | 23.039 | 0.37 | | |
| 3 | 27.427 | 3.34 | 1.62374 | 47.1 |
| 4 | −248.837 | variable | | |
| 5 | 39.943 | 0.99 | 1.83481 | 42.7 |
| 6 | 7.067 | 2.58 | | |
| 7 | −18.771 | 0.99 | 1.77250 | 49.6 |
| 8 | 49.642 | 0.12 | | |
| 9 | 16.139 | 2.77 | 1.84666 | 23.8 |
| 10 | −73.668 | variable | | |
| 11 | −315.129 | 1.87 | 1.69680 | 55.5 |
| 12 | −26.062 | 1.71 | | |
| 13 | 15.927 | 2.49 | 1.80610 | 40.9 |
| 14 | −79.506 | 0.32 | | |
| 15 | −28.702 | 1.09 | 1.84666 | 23.8 |
| 16 | 28.70 2 | 3.47 | | |
| 17 | 25.490 | 1.19 | 1.80518 | 25.4 |
| 18 | 12.854 | 0.33 | | |
| 19 | 19.777 | 2.57 | 1.77250 | 49.6 |
| 20 | −19.777 | variable | | |
| 21 | ∞ | 23.00 | 1.49782 | 66.8 |
| 22 | ∞ | | | |

TABLE 10

| FNo. | 2.0 | 2.4 | 2.8 |
|---|---|---|---|
| f | 7.20 | 14.00 | 21.00 |
| fB | 0.00 | 0.00 | 0.00 |
| ω | 23.1 | 12.0 | 8.1 |
| d4 | 3.57 | 13.77 | 16.15 |
| d10 | 24.43 | 10.12 | 3.08 |

TABLE 10-continued

| FNo. | 2.0 | 2.4 | 2.8 |
|---|---|---|---|
| d20 | 0.88 | 4.98 | 9.65 |

The following Table 11 shows the relationship between the conditions and respective Embodiments described hereinbefore.

TABLE 11

| Condition | Ex. 1 | Ex. 2 | Ex. 3 | Ex. 4 | Ex. 5 |
|---|---|---|---|---|---|
| fw/f1 | 0.104 | 0.090 | 0.086 | 0.094 | 0.096 |
| fw/f2 | −0.62 | −0.63 | −0.65 | −0.59 | −0.58 |
| fw/f3 | 0.43 | 0.47 | 0.45 | 0.40 | 0.45 |
| logz3/logz | 0.79 | 0.88 | 0.88 | 0.76 | 0.765 |
| m2 | −0.22~ | −0.18~ | −0.17~ | −0.21~ | −0.22~ |
|  | −0.28 | −0.21 | −0.20 | −0.27 | −0.29 |
| m3w | −0.47 | −0.49 | −0.50 | −0.45 | −0.43 |
| m3t | −1.07 | −1.24 | −1.25 | −1.00 | −0.98 |
| fBw | 12.83 | 12.75 | 12.85 | 16.36 | 16.23 |
| fBw/fw | 2.09 | 2.07 | 2.09 | 2.64 | 2.25 |
| logz2/logz | 0.21 | 0.12 | 0.12 | 0.24 | 0.235 |
| dS/ft | 1.17 | 0.97 | 1.12 | 1.33 | 1.16 |

What is claimed is:

1. A zoom lens system comprising, in order from the object side:

a first positive lens group;

a second negative lens group; and a third positive lens group; wherein at least said second lens group and said third lens group are movable along an optical axis for changing magnification, said zoom lens system satisfying the following conditions (a)–(d):

(a) $0 < fw/f1 < 0.25$ (b) $-0.9 < fw/f2 < -0.4$ (c) $0.3 < fw/f3 < 0.8$ (d) $0.7 < \log z3 / \log z < 1.0$ where fw is the overall focal length of said zoom lens system at the wide angle end;

f1 is the focal length of said first lens group, f2 is the focal length of said second lens group, f3 is the focal length of said third lens group, z is the overall change ratio of magnification of said zoom lens system, wherein $z = ft/fw$, ft is the overall focal length of said zoom lens system at the telescopic end, z3 is the change ratio of magnification of said third lens group, wherein $z3 = m3t/m3w$, m3t is a lateral magnification of said third lens group at the wide angle end, m3w is a lateral magnification of said third lens group at the telescopic end.

2. The zoom lens system according to claim 1, further satisfying the following conditions (e) and (f):

(e) $-1 < m2 < 0$ (f) $m3t < -1 < m3w$ where m2 is a lateral magnification of said second lens group from a wide angle side to a tele photographing side.

3. The zoom lens system according to claim 1, further satisfying the following condition (g):

(g) $1.5 < fBw/fw$ where fBw is the back focus at the end of the wide angle.

4. The zoom lens system according to claim 1, wherein said first lens group is fixed at the time of zooming.

5. The zoom lens system according to claim 1, further comprising an aperture disposed at said object side of said third lens group, wherein said aperture is movable with said third lens group for zooming.

6. The zoom lens system according to claim 1, wherein said third lens group comprises, in order from said object side a positive 3*a* lens, an aperture, and a positive 3*b* lens, said aperture being movable with said third lens group.

7. The zoom lens system according to claim 1, wherein said zoom lens system further satisfies the following conditions:

(i) $1.0 < dS/ft < 2.0$ (j) $2.1 < fBw/fw < 3.5$ where ft is the overall focal length of said zoom lens system at the telescopic end, dS is the distance between said second and said third lens groups at the wide angle end, fw is the overall focal length of said zoom lens system at the wide angle end, and fBw is the back focus at the end of the wide angle.

8. The zoom lens system according to claim 7, wherein said first lens group is fixed at the time of zooming.

9. The zoom lens system according to claim 7, wherein only said second lens group is movable for focusing.

10. A zoom lens system comprising, in order from the object side:

a first positive lens group;

a second negative lens group; and a third positive lens group; wherein said second lens group and said third lens group are movable along an optical axis for changing magnification and said second lens group is movable for focusing; further wherein said zoom lens system satisfies the following conditions:

$$-1 < m2 < 0$$

and $$0.0 < \log z2 / \log z < 0.3$$

where m2 is a lateral magnification of said second lens group from a wide angle side to a tele photographing side, z2 is the magnification ratio ($z2 = m2L/m2s$) of said second lens group, m2L is a lateral magnification of said second lens group at the telescopic end, m2S is a lateral magnification of said second lens group at the wide angle end, z is the overall change ratio ($z = ft/fw$) of magnification of said zoom lens system, fw is the overall focal length of said zoom lens system at the wide angle end, and ft is the overall focal length of said zoom lens system at the telescopic end.

11. The zoom lens system according to claim 10, wherein said first lens group is fixed at the time of focusing.

12. The zoom lens system according to claim 10, wherein said first lens group is fixed at the time of zooming.

13. A zoom lens system comprising, in order from the object side:
- a first positive lens group;
- a second negative lens group; and
- a third positive lens group;
- wherein first lens group is fixed at a time of zooming, said second lens group and said third lens group are movable along an optical axis for changing magnification, and said second lens group is movable for focusing; and wherein said zoom lens system satisfies the following condition:

$$-1 < m2 < 0$$

where m2 is a lateral magnification of said second lens group from a wide angle side to a tele photographing side.

* * * * *